US007090433B2

(12) United States Patent
Searby

(10) Patent No.: US 7,090,433 B2
(45) Date of Patent: Aug. 15, 2006

(54) UNDERGROUND CABLE LAYING APPARATUS

(76) Inventor: Steve Searby, 506 N. Center St., Lena, IL (US) 61048-9201

( * ) Notice: Subject to any disclaimer, the term of this patent is extended or adjusted under 35 U.S.C. 154(b) by 0 days.

(21) Appl. No.: 10/680,059

(22) Filed: Oct. 7, 2003

(65) Prior Publication Data

US 2005/0074293 A1   Apr. 7, 2005

(51) Int. Cl.
*E02F 5/10* (2006.01)

(52) U.S. Cl. ...................................... 405/183; 405/183

(58) Field of Classification Search ........ 405/174–183; 37/142.5; 111/152, 195, 163, 164, 167, 166, 111/199
See application file for complete search history.

(56) References Cited

U.S. PATENT DOCUMENTS

| | | | | |
|---|---|---|---|---|
| 486,035 A * | 11/1892 | Fuller et al. | .................. | 111/52 |
| 909,137 A * | 1/1909 | Bellerive | ..................... | 111/190 |
| 2,314,045 A * | 3/1943 | Johnson | ...................... | 405/176 |
| 2,496,885 A * | 2/1950 | Milton | ....................... | 111/178 |
| 2,924,186 A * | 2/1960 | Landeen | ..................... | 111/199 |
| 3,685,469 A * | 8/1972 | Rogers | ....................... | 111/158 |
| 3,722,224 A * | 3/1973 | Roy | ............................. | 405/163 |
| 3,952,810 A * | 4/1976 | Ulrich | ......................... | 172/40 |
| 4,009,668 A * | 3/1977 | Brass et al. | .................. | 111/137 |
| 4,092,936 A * | 6/1978 | Griffin et al. | ................ | 111/199 |
| 4,141,302 A * | 2/1979 | Morrison, Jr. et al. | ........ | 111/52 |
| 4,159,190 A * | 6/1979 | Duggins et al. | ............. | 405/179 |
| 4,198,103 A * | 4/1980 | Ward et al. | .................. | 305/165 |
| 4,232,982 A * | 11/1980 | Satterwhite | .................. | 405/179 |
| 4,275,671 A * | 6/1981 | Baker | ......................... | 111/195 |
| 4,307,674 A * | 12/1981 | Jennings et al. | ............ | 111/164 |
| 4,393,791 A * | 7/1983 | Suderman | .................. | 111/195 |
| 4,461,598 A * | 7/1984 | Flechs | ......................... | 405/181 |
| 4,595,240 A * | 6/1986 | Pettersson | ..................... | 299/24 |
| 4,700,641 A * | 10/1987 | Head, Jr. et al. | ............ | 111/194 |
| 4,812,078 A * | 3/1989 | Rivard | ........................ | 405/179 |
| 4,878,443 A * | 11/1989 | Gardner | ...................... | 111/141 |
| 5,074,227 A * | 12/1991 | Schwitters | ................... | 111/137 |
| 5,174,686 A * | 12/1992 | Raymond | .................... | 405/184 |
| 5,427,038 A * | 6/1995 | Ege | ............................ | 111/137 |
| 5,443,023 A * | 8/1995 | Carroll | ....................... | 111/191 |
| 5,603,269 A * | 2/1997 | Bassett | ........................ | 111/52 |
| 5,640,915 A * | 6/1997 | Schaffert | ..................... | 111/150 |
| 5,645,000 A * | 7/1997 | Carroll | ....................... | 111/195 |
| 5,673,638 A * | 10/1997 | Keeton | ........................ | 111/167 |
| 6,314,897 B1* | 11/2001 | Hagny | ........................ | 111/192 |
| 6,321,667 B1* | 11/2001 | Shoup | ......................... | 111/137 |
| 6,578,502 B1* | 6/2003 | Barnstable et al. | ......... | 111/164 |
| 6,895,876 B1* | 5/2005 | Bergere et al. | ............. | 111/134 |
| 2003/0183141 A1* | 10/2003 | Bergere et al. | ............. | 111/156 |
| 2004/0205987 A1* | 10/2004 | Wasserburger | ............... | 37/347 |

\* cited by examiner

*Primary Examiner*—Patricia L. Engle
*Assistant Examiner*—Gay Ann Spahn
(74) *Attorney, Agent, or Firm*—Reinhart Boerner Van Deuren P.C.

(57) ABSTRACT

Presented is an underground cable laying apparatus that leaves virtually no visible scar in the turf under which cable, wire, line, hose, etc. is laid. The apparatus utilizes a pair of angularly displaced turf slicing wheels to slice and separate the turf forming a slit into which cable may be laid. A cable guide tube and roller properly place the cable within the slit. A pair of turf closure wheels close the slit in close proximity to the release point of the cable to ensure proper placement of the cable. The slit in the turf is gently and completely closed over the cable, leaving virtually no visible scar within the turf to upset the aesthetic beauty of a lawn. Further, the configuration and rolling action of the turf slicing wheels ensures that other underground cables will not be damaged if inadvertently encountered.

14 Claims, 6 Drawing Sheets

UNDERGROUND CABLE LAYING APPARATUS

FIELD OF THE INVENTION

This invention relates generally to cable laying apparatuses, and more particularly to underground cable laying apparatuses, trenchers, and the like.

BACKGROUND OF THE INVENTION

Aesthetics have always played an important role in home design and landscaping. Indeed, most homeowners take pride in the appearance of their yards and landscaping, often devoting many hours each weekend to ensuring that their lawn and garden look attractive and uncluttered.

Unfortunately, the necessities of day-to-day living often result in the use and installation of unsightly equipment. For example, the use of a garden hose and sprinkler to water the lawn and garden, the use of a fence to contain a pet, the running of cables and wires for lighting, cable TV, internet services, etc. all are visibly unappealing to many homeowners. The solution of choice for many homeowners is to run such cables, wires, pet containment systems, sprinkler systems, etc., underground so as to be hidden from view while still allowing the homeowner to reap the benefits provided thereby.

To run each of these varied systems underground, trenchers are used to dig a small trench in the yard into which is laid the cable, wire, pipe, etc., for the particular system being installed. The soil removed from the trench is then put back in over the wire, cable, pipe, etc. In this way, each of these systems, wires, cable, etc., are hidden from view.

Unfortunately, this solution to the aesthetic problem has resulted in an underground maze of wires, cable, pipes, etc., for which no coordinated mapping is typically provided. Further, utility marking services such as JULIE do not provide marking of such consumer-installed underground cables, wires, pipes, etc., instead only marking the main utilities of gas, electric, water, etc. As a result, the attempted installation of subsequent underground systems using a trencher often results in damage or breakage of the underground lines, cables, wires, pipes, etc., of previously installed underground systems. This not only results in frustration of the homeowner as the affected system may no longer be used until it is repaired, but also additional expense for the installers of the subsequent underground systems who have caused the damage and now must bear the expense of repair. Additionally, the type of damage resulting from the use of current methods for underground cable laying often results in multiple breaks in the underground system. That is, oftentimes the underground line, cable, wire, pipe, etc., is snagged by these trenching apparatus and pulled along until a failure occurs in the affected system. Such failures may be at locations other than the point at which the system was snagged by the trencher, often requiring a large portion of the damaged underground system to be dug up to effectuate the repair at the locations of the break.

A further disadvantage with current methods for laying underground cable, wire, flexible tubing, etc., is that the current methods leave a visible scar in the yard. This scar typically requires the planting of additional grass or other ground cover seed, which further increases the expense, detracts from the aesthetics which it was meant to protect, and requires additional lawn care to properly water the newly planted seed to ensure germination and full growth to fully hide the trenched scar.

There exists, therefore, a need in the art for a new and improved underground cable, wire, line, tubing, etc., laying apparatus and method that substantially reduces or eliminates the risk of breaking other underground systems, and which does not leave a visible scar in the yard that requires additional care and expense to correct.

BRIEF SUMMARY OF THE INVENTION

The present invention provides a new and improved underground cable and the like laying apparatus. More particularly, the present invention provides a new and improved underground cable laying apparatus that is capable of crossing without damaging other underground cables and the like. Further, the present invention provides a new and improved underground cable laying apparatus that does not leave a visibly obvious scar in the lawn under which the cable has been laid.

In accordance with one embodiment of the present invention, the underground cable laying apparatus includes a pair of angularly displaced turf slicing wheels that slice and separate the turf under which the underground cable is to be laid. A cable feed tube is positioned between the turf slicing wheels to guide the underground cable between the turf slicing wheels. A cable feed guide wheel is positioned rearward of the opening of the cable feed tube to aid in the positioning and proper laying of the underground cable in a smooth fashion. In a preferred embodiment, the leading edge of the cable feed tube includes a feed tube support extension member to provide additional rigidity and stabilization of the cable feed tube placement while laying the underground cable. A cable guide wheel cleaning mechanism can be applied to prevent the build up of soil on the guide wheel. A cable guide may also be employed at an insertion end of the cable feed tube.

In a preferred embodiment of the present invention, the underground cable laying apparatus also includes turf closing wheels operative to close the slit in the turf into which the cable has been laid. These turf closing wheels are carried by a turf closure housing that is pivotably coupled to the mounting yoke of the cable laying apparatus. Preferably, the turf closing wheels are spring loaded by a turf follower spring within the turf closure housing. This turf follower spring is preferably adjustable to vary the spring load tension on the closing wheels based upon the type of lawn under which the cable is to be laid. Positioning detents or blocks limit the downward travel of the turf closure housing under action of the turf follower spring.

In a preferred method of laying underground cable and the like in accordance with the teachings of the present invention, a thin slice in the turf is opened by the turf slicing wheels. Preferably, the soil is moist, either from natural sources or from a step of watering. Cable or the like is then positioned within the open slice in the turf. Preferably, this step is accomplished by guiding the cable to be laid into the slice in the turf. This step of guiding may be accomplished in a preferred embodiment through the use of a cable feed tube having at an aft end thereof a cable guide, which may take the form of a wheel, roller, guide bar, etc. This structure performs the function of maintaining the cable to be laid in the proper position within the slice in the turf.

Preferably, the method of laying underground cable in accordance with the present invention also includes the step of closing the slice in the turf once the cable has been laid therein. This step may be performed by providing a closing force in a direction to close the slit. Preferably, this closing force is applied to either side of the slit to preclude damage to the turf under which the cable has been laid.

Through the method of the present invention, damage to other underground systems, such as invisible fencing, other cables or wires, or sprinkler systems is precluded or the likelihood of such is significantly reduced. This is so because the rolling action of the turf slicing wheels does not snag or otherwise cut the other underground wires as occurs within the prior art methods of laying cable. As such, a significant advantage is realized through the use of the present invention for laying underground cable and the like. Similarly, by opening a thin slice in the turf which is then closed by applying a force to either side of the slice, the unsightly scarring of the turf that commonly results with prior art methods is also precluded.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
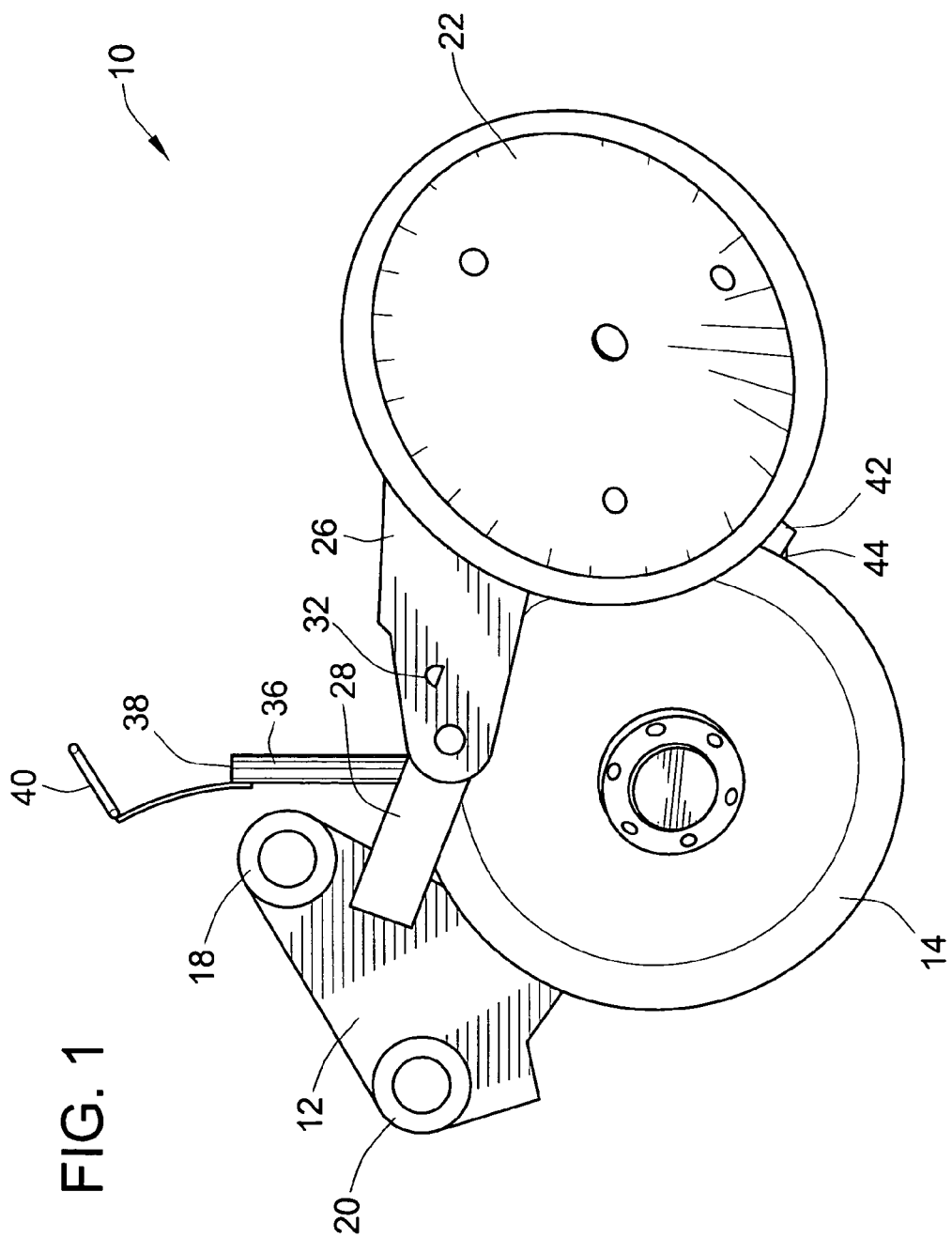
FIG. 1 is a side view illustration of an embodiment of an underground cable laying apparatus constructed in accordance with the teachings of the present invention.

Turning now to the drawings, there is illustrated in FIG. 1 an exemplary embodiment of an underground cable laying apparatus 10 constructed in accordance with the teachings of the present invention. In the interests of brevity, the term cable will be used throughout this description to include cable, line, wire, hose, fiber optic cable, tubing, etc., that one may desire to bury under the surface of the ground. As may be seen from this FIG. 1, the underground cable laying apparatus 10 includes a mounting yoke 12 on which is mounted a pair of turf slicing wheels 14, 16 (see FIG. 2). The mounting yoke 12 includes mounting receptacles, for example receptacles 18, 20 that are positioned and configured to allow the apparatus 10 to be mounted to a truck or other vehicle that will be used in the cable laying process. As such, the particular configuration and placement of the mounting receptacles may vary in particular embodiments based upon the type of vehicle used in the cable laying process. Indeed, the position and configuration of the mounting receptacles may accommodate the usage of an intermediate mounting or other equipment, for example a shaker unit, that may be directly mounted to the vehicle.

In addition to the turf slicing wheels 14, 16, a turf closing mechanism, for example turf closing wheels 22, 24 carried on a turf closure housing 26, is pivotably mounted to the yoke 12 by the closure assembly mounting arms 28, 30. The turf closure housing 26 may include positioning detents 32, 34, blocks, shoulders, or other movement limiting structure to prevent the turf closure wheels 22, 24 and their associated housing 26 from pivoting downward beyond a desired location. However, as will be discussed more fully below, the upward pivoting of the housing 26 is preferably unimpeded within a range to allow the turf closing wheels 22, 24 to follow the contours of the soil into which the cable has been laid.

The underground cable laying apparatus also includes a cable feed tube 36 used to guide the cable to be laid through the apparatus 10. To facilitate this operation, the cable feed tube 36 includes a cable inlet 38 at a forward location of the apparatus 10 that receives the cable from the spool or other holding device. If desired, the cable feed tube 36 may also include a cable guide 40 positioned above inlet 38. This cable guide 40 may have a diameter larger than the inlet 38 to allow for some play in the cable before it enters inlet 38. The cable feed tube 36 leads down between the turf slicing wheels 14 to a position rearward of the leading edges thereof. At this position the cable feed tube outlet 42 dispenses the cable to be laid in the slice in the turf which has been created by the turf slicing wheels 14, 16. At this outlet 42 a feed tube support extension member 44 may be provided to add additional stability and support for the end of the cable feed tube 36.

Figure 2:
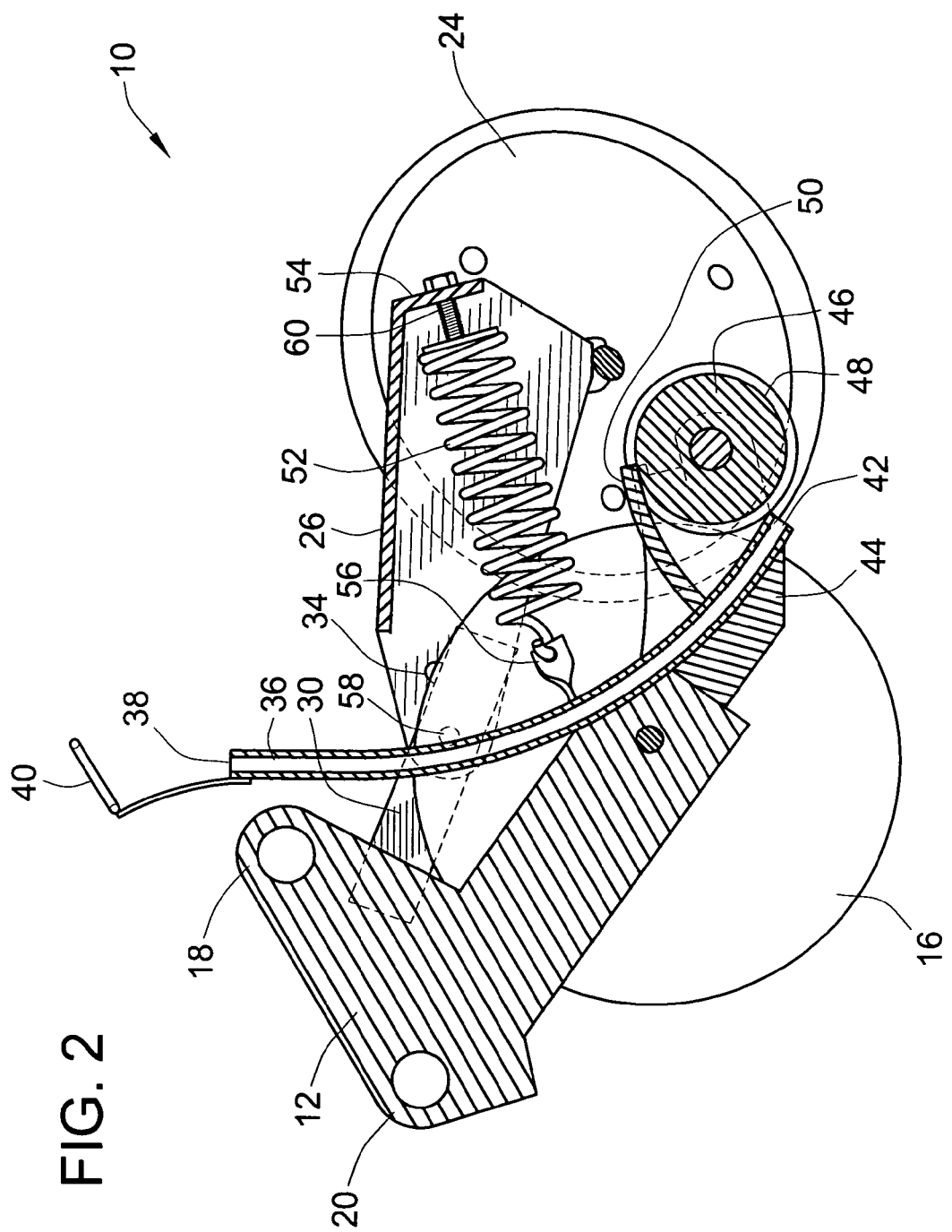
FIG. 2 is a cross-sectional illustration of the cable laying apparatus of FIG. 1.

FIG. 2 provides a cross-sectional illustration of the underground cable laying apparatus 10 illustrated in FIG. 1. As may be seen from this cross-sectional illustration, the positioning of the cable feed tube 36 preferably provides a curved path through which the cable may be directed through the apparatus. In this way, the possibility of snagging or chafing the exterior of the cable to be laid is greatly reduced over prior systems that terminated in an outlet perpendicular to the trench into which the cable was to be laid. To further aid in the smooth and proper positioning of the cable within the slice in the turf created by the turf slicing wheels 14, 16, the apparatus 10 of the present invention may also include a cable feed guide, such as wheel 46. This cable feed guide wheel 46 is positioned in proximity to the outlet 42 to further place the cable in the proper position in the slice in the turf without scraping or otherwise damaging the exterior surface of the cable. Indeed, in embodiments that utilize this cable feed guide the cable feed tube may be straight with an outlet perpendicular to the slit as the cable feed guide will ensure a smooth directional change in the cable without damage thereto. To prevent the buildup of soil within the groove 48 of the cable feed guide wheel 46, a groove cleaning rod 50 may be provided. This groove cleaning rod 50 is positioned within the groove 48 of the cable feed guide wheel 46 in such a manner so as to prevent or reduce the amount of buildup of soil within the groove so that the cable being dispensed may be gently guided within the groove 48 to its proper position within the slit in the turf.

As may also be seen from this cross-sectional illustration of FIG. 2, the turf closure housing 26 is spring-biased to its downward position by a turf follower spring 52. Preferably, this turf follower spring 52 is coupled between the mounting yoke 12 via a spring mount 56 and the rearward wall 54 of the turf closure housing 26, rearward of the pivot point 58. The amount of force that the turf closure wheels 22, 24 apply to the turf may be adjusted by varying the spring tension. In the embodiment illustrated in FIG. 2, this spring tension variation may be accomplished by adjusting spring tension nut 60. The adjustment of this spring tension is facilitated by the positioning detents 32, 34 as they prevent further downward pivoting of the turf closure housing 26 through their engagement with the closure assembly mounting arms 28, 30.

Figure 3:
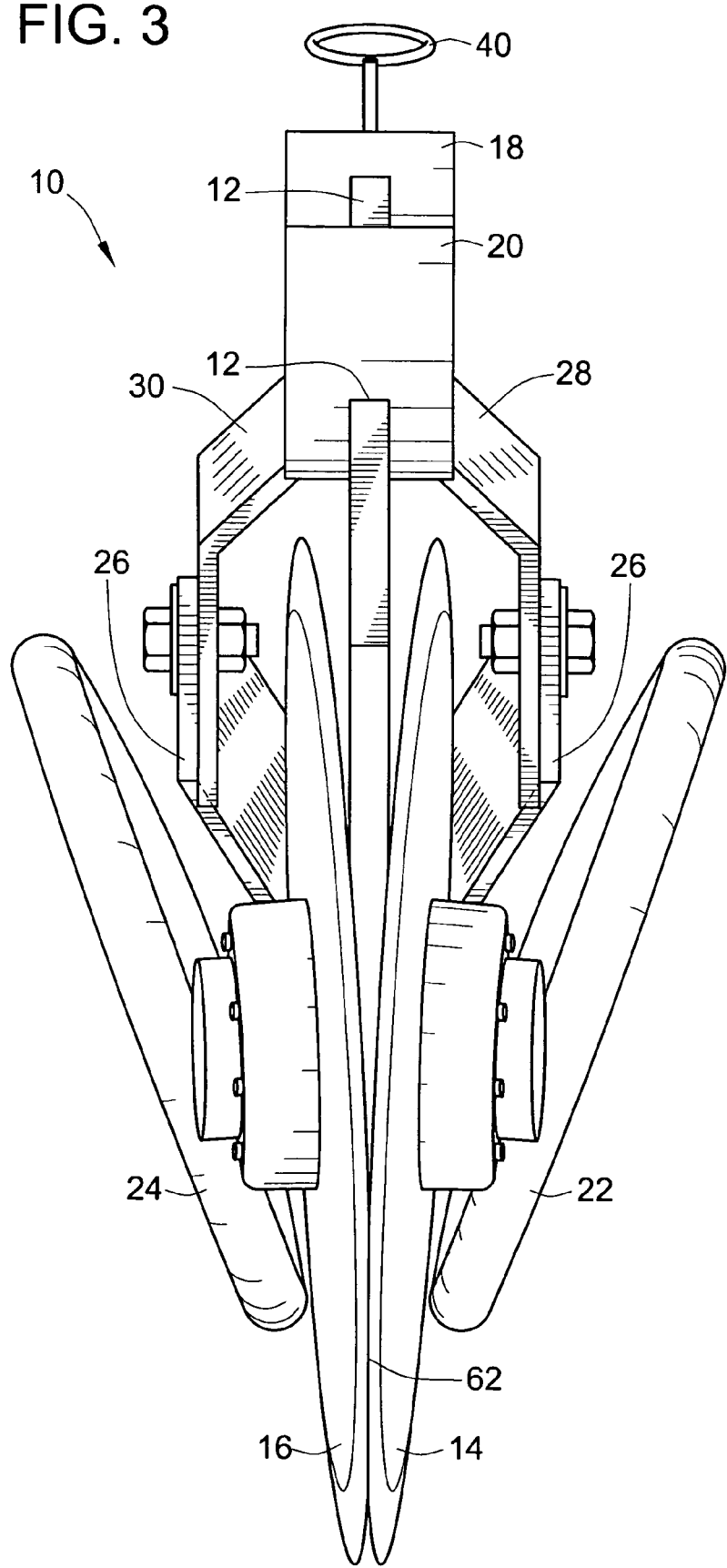
FIG. 3 is a frontal isometric view of the cable laying apparatus of FIG. 1.

As may be seen from the frontal isometric illustration of FIG. 3, the turf slicing wheels 14, 16 are angularly positioned relative to one another. Preferably, they are angularly positioned relative to both the horizontal and vertical axis of the mounting yoke 12. That is, the turf slicing wheels 14, 16 are positioned such that they contact each other along an area 62, and are elsewhere displaced from one another. This displacement between the turf slicing wheels 14, 16 preferably increases both along a horizontal and vertical axis such that a small slice is initiated in the turf by the forward contact area 62, and is widened along both the horizontal and vertical axes as the apparatus 10 is moved through the turf. In this way, the turf defining the slit is displaced both outwardly and upwardly to accept the cable to be laid therein. With such a displacement of the turf defining the slit, the turf closure wheels 22, which provide an angular closing force on either side thereof, may then fully close the slit without damage to the turf. Indeed, in most situations the closure of the slit is complete without leaving a residual scar in the turf whatsoever. As may be seen from this frontal view of FIG. 3, the angular displacement of the turf closure wheels 22, 24 is preferably greater than the angular displacement along the same axis of the turf slicing wheels 14, 16.

Figure 4:
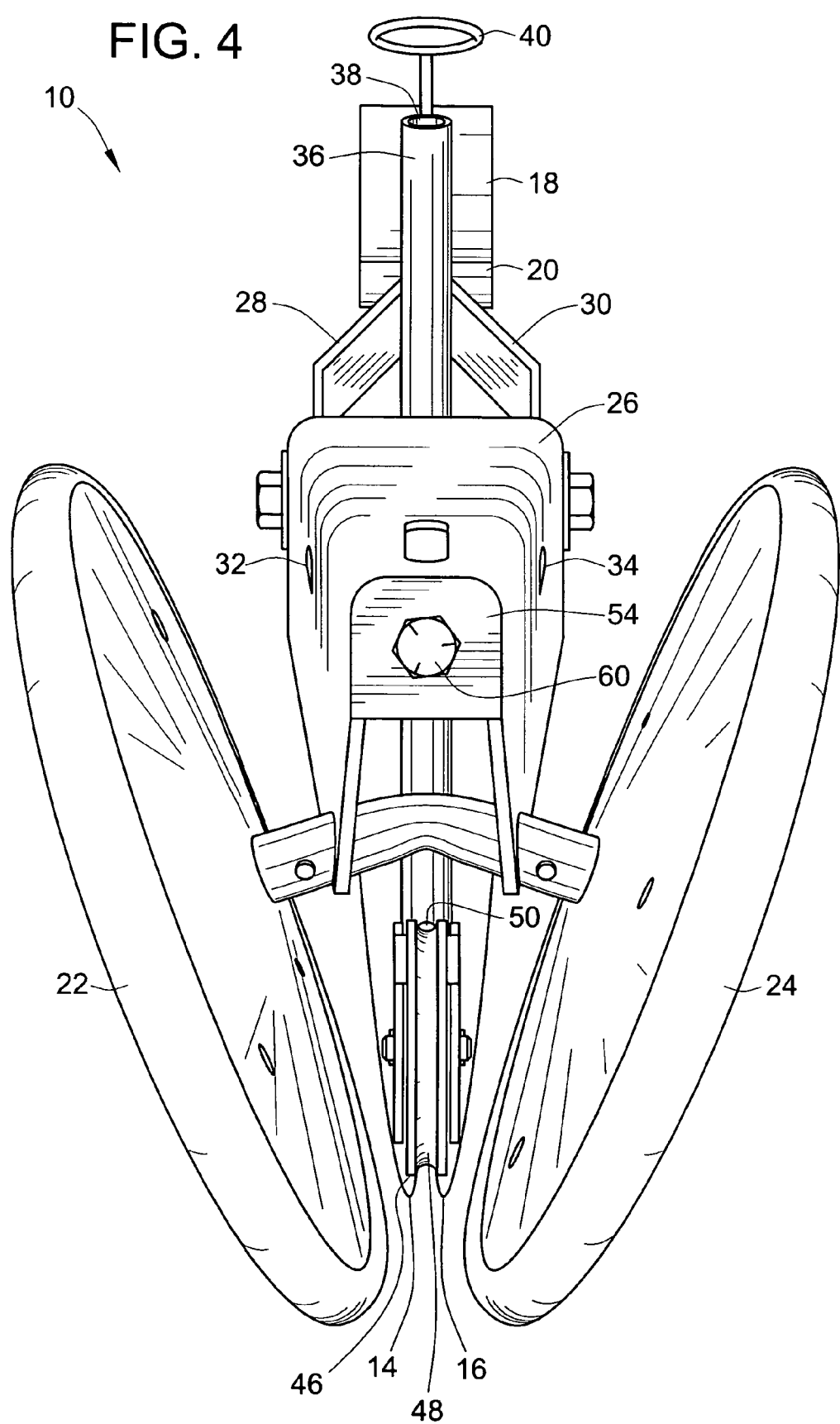
FIG. 4 is a rear isometric illustration of the cable laying apparatus of FIG. 1.
Figure 5:
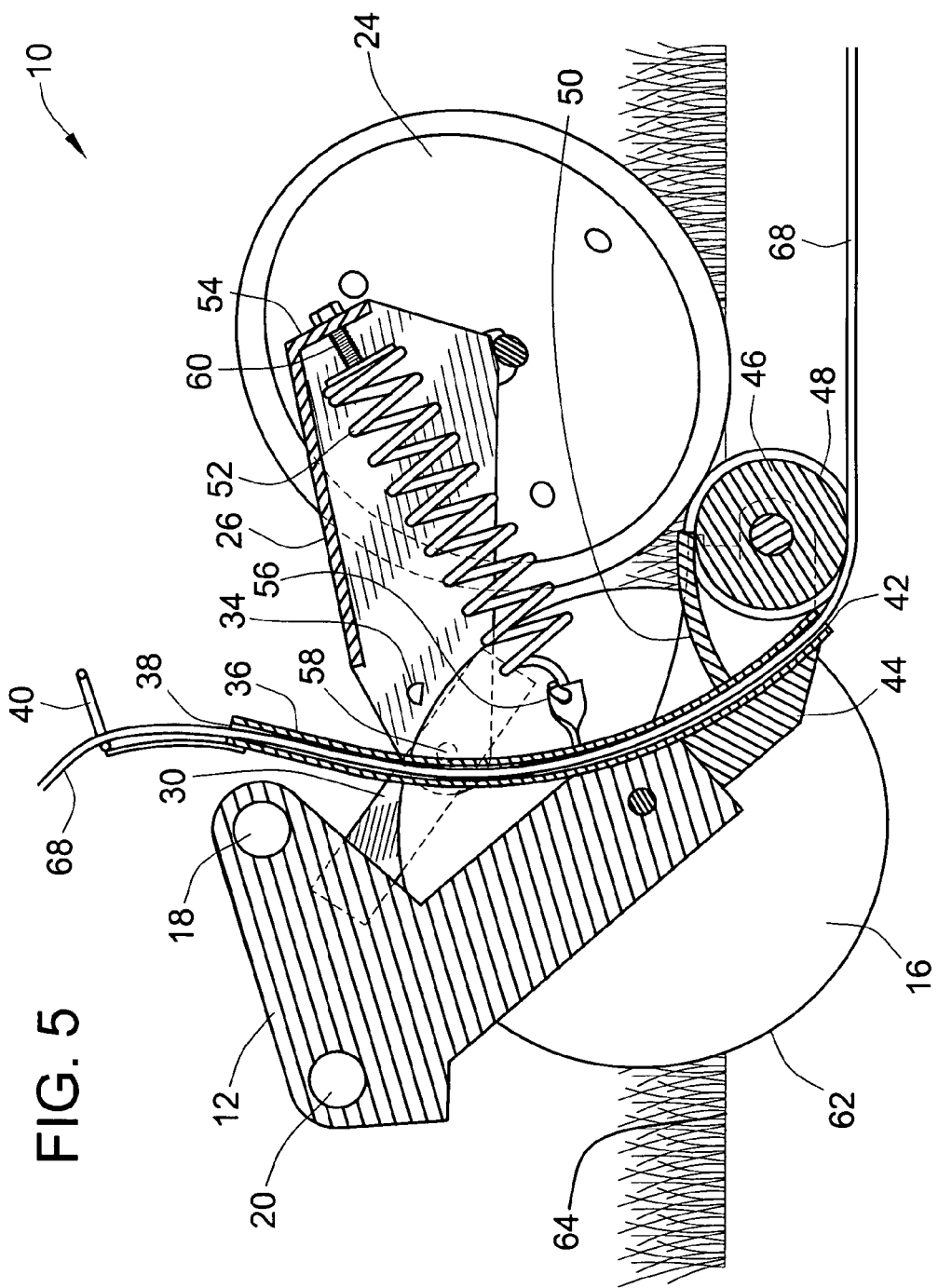
FIG. 5 is a cross-sectional illustration of the cable laying apparatus of FIG. 1 shown in operation laying an underground cable.

As may be seen from the rear isometric view of FIG. 4, the cable feed guide wheel 46 is positioned to dispense the cable to be laid in the center of the slit in the turf created by turf slicing wheels 14, 16, prior to the application of the closing force on the slit by turf closing wheels 22, 24.

In operation, the apparatus 10 is lowered by the vehicle so that the contact area 62 of the turf slicing wheels contacts the upper surface 64 of the turf. As the vehicle travels across the turf, rotation of the turf slicing wheels 14, 16 creates the slit in the turf that preferably opens both horizontally and vertically to receive the cable to be laid therein. Since the turf closure wheels 22, 24 are displaced horizontally from one another by an amount greater than the maximum slit width, the wheels 22, 24 ride on the outside of the slit and provide a downward and inward closure force to effectuate a closure of the slit once the cable has been laid therein. The amount of force applied on the sides of the slit is dependent upon the setting of the spring force of the turf follower spring 52 as discussed above. Also, due to the close proximity of the turf closure wheels 22, 24 to the rearward edge of the turf slicing wheels 14, 16, closure of the slit into which the cable has been laid occurs in very close proximity to the point where the cable leaves the cable feed guide wheel. In this way, the proper positioning of the cable within the slit is ensured. With prior trencher systems, coils in the cable may allow the cable to rise above the bottom of the trench before the soil is placed back in the trench, resulting in areas where the cable is shallower than in others, which may result in uncovering of the cable and forming a hazardous condition.

Figure 6:
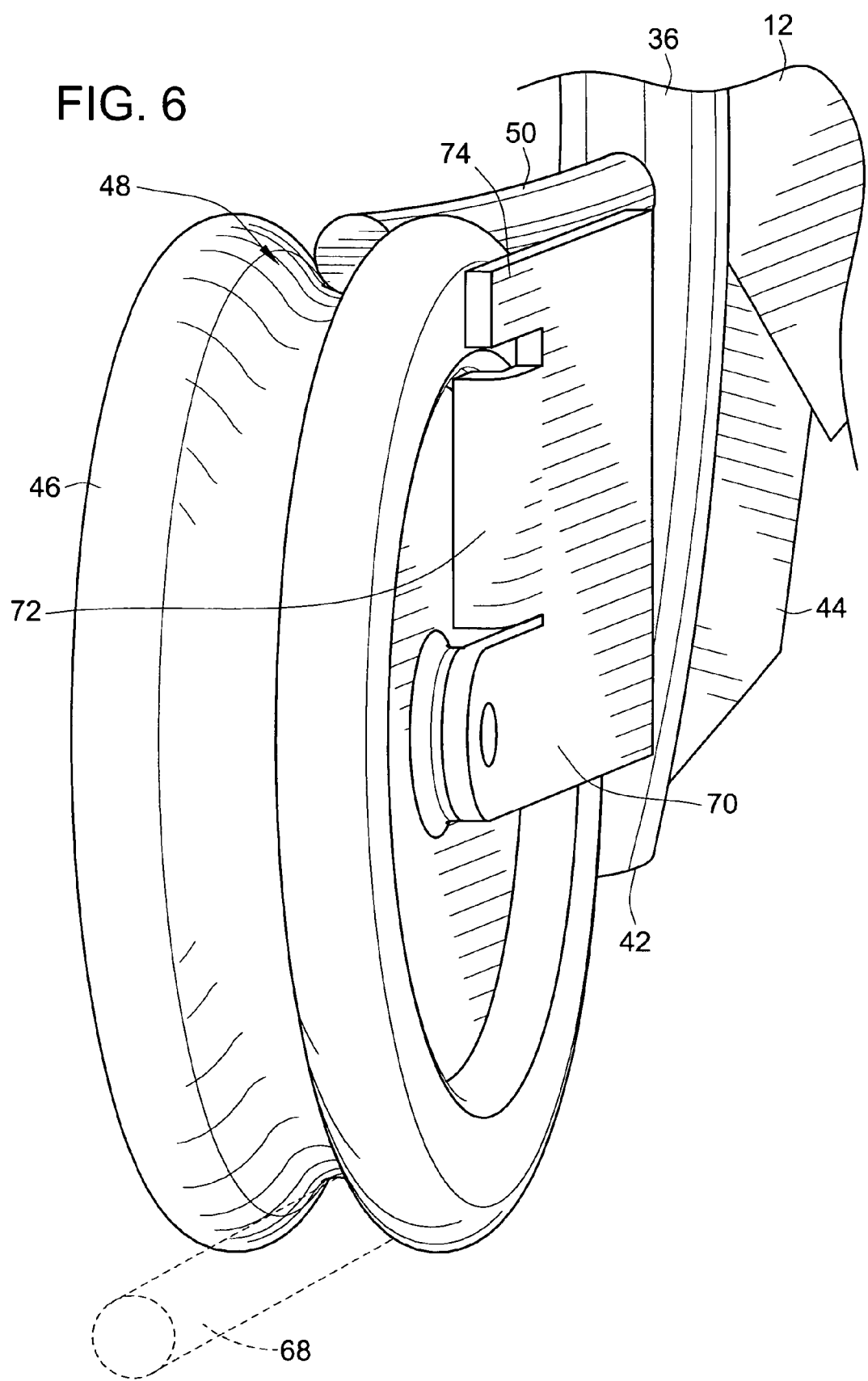
FIG. 6 is a partial isometric illustration of a cable feed guide wheel assembly of the cable laying apparatus of FIG. 1.

As discussed briefly above, to ensure that the cable is properly positioned within the slit in the turf, a cable feed guide wheel 46 is used. However, one skilled in the art will recognize that a roller or other guide mechanism may be used at this location to provide proper placement and smooth transitioning of the cable from the cable feed tube to its position in the bottom of the slit. In an embodiment that utilizes a cable feed guide wheel 26, such as that illustrated in FIG. 6, the provision of a guide wheel cleaning mechanism may be desired. As introduced above, this cleaning mechanism may include a cable groove cleaning rod 50 that rides in the groove 48 of the cable feed guide wheel 46. As the wheel rotates while dispensing the cable 68 any dirt or other debris that may accumulate within groove 48 will be displaced by the cleaning rod 50. Similarly, the cable feed guide wheel housing 70 may include wheel edge scrapers 72, 74 that clean the sides of the wheel 46 and prevent the accumulation of soil or other debris, which may affect the ability of the wheel 46 to rotate.

The underground cable laying apparatus of the present invention provides significant advantage through the use of the turf slicing wheels, particularly in installation locations where other installed underground systems may be in place, and where a visible scar in the turf resulting from the cable laying operation is not desired. In the first instance, the apparatus of the present invention provides a significant advantage through the use of the rotating turf slicing wheels for providing the slit in the turf into which the cable is to be laid. Since the turf slicing wheels rotate, there is a significantly reduced likelihood of damage to other installed underground systems as results from typical trenchers. Specifically, the rotating turf slicing wheels will not snag and pull the other underground systems which it encounters, and instead merely rolls over them while leaving them in place. This non-damaging contact with previously installed underground systems is aided by the angular relationship between the two turf slicing wheels. That is, the relative angular displacement of the turf slicing wheels forms a contact portion 62 that slices the top layer of the turf, but then separate from one another at all other locations. As a result, contact with previously installed underground systems often occurs at a position where the turf slicing wheels 14, 16 are separated from one another, but are still in close proximity. As a result, the contact force is dispersed at the two contact points with each of the individual turf slicing wheels. Since these wheels are most likely still in close proximity, the contact force is not sufficient to damage the exterior surface of the previously installed underground system.

In the second instance, unlike blade type systems that gouge a slit into the turf, and trencher systems that completely remove the soil to form a trench, the underground cable laying apparatus of the present invention merely opens a slit in the turf, which is quickly reclosed once the cable has been placed therein. The angular placement of the turf slicing wheels ensures a narrow slit is initiated in the turf, is slightly widened to allow placement of the cable therein, and then is immediately reclosed by providing angular downward and inward force on the sides of the slit opened by the turf slicing wheels. As a result, it is nearly impossible to observe where the slit was opened in the turf once the cable has been laid therein. This is especially true when the turf is moist, or has been recently watered.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An underground cable laying apparatus, comprising:
   a mounting yoke;
   a pair of angularly displaced turf slicing wheels rotatably coupled to the mounting yoke, the turf slicing wheels defining a forward contact area therebetween;
   a cable guide tube positioned aft of the forward contact area of the turf slicing wheels, the cable guide tube having a cable inlet and a cable outlet; and
   a cable feed guide mechanism positioned in proximity to the cable outlet, aft of the cable guide tube, wherein the cable feed guide mechanism is a guide wheel having a groove around an outer periphery thereof sized to accommodate the cable to be laid.

2. The underground cable laying apparatus of claim 1, further comprising a feed tube support extension member coupled to the cable guide tube in proximity to the cable outlet.

3. The underground cable laying apparatus of claim 1, further comprising a cable guide coupled to the cable guide tube and displaced from the cable inlet to aid in guiding cable into the cable inlet.

4. The underground cable laying apparatus of claim 1, wherein the cable guide tube is curved from the cable inlet to the cable outlet.

5. The underground cable laying apparatus of claim 1, further comprising a guide wheel cleaning mechanism operably connected to the guide wheel to remove foreign debris therefrom.

6. The underground cable laying apparatus of claim 5, wherein the guide wheel cleaning mechanism comprises a groove cleaning rod positioned within the groove of the guide wheel.

7. The underground cable laying apparatus of claim 6, wherein the guide wheel cleaning mechanism further comprises wheel edge scrapers positioned along either side of the guide wheel.

8. The underground cable laying apparatus of claim 1, wherein the mounting yoke includes at least one mounting receptacle.

9. The apparatus of claim 1, further comprising a turf closure assembly operably coupled to the mounting yoke and positioned relative to the pair of turf slicing wheels to close the slit in the turf opened thereby aft of the cable outlet.

10. The apparatus of claim 9, wherein the turf closure assembly comprises a pair of turf closing wheels angularly positioned relative to one another and laterally displaced from one another a distance greater than a lateral spacing at a trailing edge of the pair of turf slicing wheels.

11. An apparatus for laying cable under turf without leaving a visibly obvious scar in the turf, comprising:
    a mounting yoke having at least one mounting receptacle defined therein;
    a pair of turf slicing wheels rotatably mounted on the mounting yoke, the turf slicing wheels being positioned in a diverging relationship to one another and defining a forward contact area therebetween for opening a slit in the turf when the pair of turf slicing wheels is pulled therethrough;
    a cable feed tube positioned between the pair of turf slicing wheels and terminating in a cable outlet positioned to guide the cable into the slit opened by the pair of turf slicing wheels; and
    a cable feed guide mechanism positioned aft of and vertically downward of the cable outlet relative to a surface of the turf to position the cable within the slit in the turf and to protect an outer surface of the cable from scraping, wherein the cable feed guide mechanism is a guide wheel having a groove around an outer periphery thereof sized to accommodate the cable to be laid.

12. An underground cable laying apparatus, comprising:
    a mounting yoke;
    a pair of angularly displaced turf slicing wheels rotatably coupled to the mounting yoke, the turf slicing wheels defining a forward contact area therebetween, and being angularly displaced relative to one another along both a horizontal and a vertical axis of the mounting yoke;
    a cable guide tube positioned aft of the forward contact area of the turf slicing wheels, the cable guide tube having a cable inlet and a cable outlet;
    a turf closure housing pivotally coupled relative to the mounting yoke;
    a pair of angularly positioned turf closing wheels rotatably coupled to the turf closure housing; and
    a pair of closure assembly mounting arms fixably coupled to the mounting yoke;
    wherein the turf closure housing is pivotally coupled to the closure assembly mounting arms, and the turf closure housing includes at least one positioning member adapted to contact at least one of the closure assembly mounting arms to limit pivotal travel of the turf closure housing in at least one direction.

13. The underground cable laying apparatus of claim 12, further comprising a turf follower spring coupled between the mounting yoke and the turf closure housing.

14. The underground cable laying apparatus of claim 13, further comprising a spring tension nut positioned to vary a bias force supplied by the turf follower spring.

* * * * *